US012651087B2

(12) United States Patent
Korzybski et al.

(10) Patent No.: US 12,651,087 B2
(45) Date of Patent: Jun. 9, 2026

(54) DEVICE AND METHOD FOR REDACTING AN IMAGE

(71) Applicant: MOTOROLA SOLUTIONS, INC., Chicago, IL (US)

(72) Inventors: Wojciech Korzybski, Cracow (PL); Bartosz Luszczak, Cracow (PL); Jakub Baranski, Cracow (PL); Pawel Abramczuk, Cracow (PL); Miroslaw Kawa, Kryspinow (PL); Katarzyna B Rugiello, Krosno (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 295 days.

(21) Appl. No.: 18/301,584

(22) Filed: Apr. 17, 2023

(65) Prior Publication Data

US 2024/0346176 A1 Oct. 17, 2024

(51) Int. Cl.
H04N 23/60 (2023.01)
G06F 21/62 (2013.01)

(52) U.S. Cl.
CPC ......... G06F 21/6245 (2013.01); H04N 23/64 (2023.01)

(58) Field of Classification Search
CPC ............................ H04N 23/64; G06F 21/6245
See application file for complete search history.

(56) References Cited

U.S. PATENT DOCUMENTS

| | | | |
|---|---|---|---|
| 7,366,359 B1 | 4/2008 | Davey et al. | |
| 8,212,872 B2 | 7/2012 | Sablak | |
| 10,346,999 B2 | 7/2019 | Wexler et al. | |
| 10,347,293 B1 * | 7/2019 | Skinner | G06F 3/1462 |
| 10,674,138 B2 | 6/2020 | Venkataraman et al. | |
| 10,757,376 B1 | 8/2020 | Yeturu et al. | |
| 11,064,107 B2 | 7/2021 | Gefen et al. | |
| 11,082,731 B1 | 8/2021 | Cox et al. | |
| 11,250,606 B2 | 2/2022 | Glaser et al. | |
| 11,856,261 B1 * | 12/2023 | Stankovska | H04N 21/44008 |

(Continued)

FOREIGN PATENT DOCUMENTS

| | | |
|---|---|---|
| EP | 2174498 B1 | 7/2020 |
| WO | 2013137534 A1 | 9/2013 |

OTHER PUBLICATIONS

Hambaly, Alfy Merican Ahmad, et al.: "System and Method for Dynamic Redaction", U.S. Appl. No. 18/058,897, filed Nov. 28, 2022, all pages.

(Continued)

*Primary Examiner* — Dhairya A Patel
(74) *Attorney, Agent, or Firm* — Raguraman Kumaresan

(57) ABSTRACT

A process for redacting an image. In operation, an electronic computing device receives an image captured by a camera corresponding to a field of view of the camera. The image contains a plurality of pixels and each pixel in the plurality of pixels capturing a respective region in a plurality of regions of the field of view of the camera. The electronic computing device measures a distance from the camera to each respective region in the plurality of regions of the field of view of the camera. The electronic computing device redacts at least one pixel in the plurality of pixels contained in the image as a function of the distance measured from the camera to a respective region captured in the at least one pixel.

18 Claims, 5 Drawing Sheets

100

(56)                    References Cited

U.S. PATENT DOCUMENTS

| | | | |
|---|---|---|---|
| 2010/0238286 A1* | 9/2010 | Boghossian | H04N 7/188 |
| | | | 348/143 |
| 2010/0328460 A1 | 12/2010 | Merkel et al. | |
| 2018/0089972 A1 | 3/2018 | Gabel et al. | |
| 2018/0268240 A1* | 9/2018 | Loce | G06V 20/70 |
| 2019/0018231 A1* | 1/2019 | Dixon | G02B 21/002 |
| 2019/0149745 A1* | 5/2019 | Green | G06V 20/00 |
| | | | 348/159 |
| 2020/0402280 A1* | 12/2020 | Lowery | G06V 10/82 |
| 2021/0035342 A1* | 2/2021 | Glaser | G06V 20/52 |
| 2021/0385386 A1 | 12/2021 | Lunt | |
| 2024/0012939 A1* | 1/2024 | Ramos | G06V 10/25 |
| 2024/0071192 A1* | 2/2024 | Sundell | G06V 10/235 |
| 2024/0127619 A1* | 4/2024 | Luczak | G06F 3/14 |

OTHER PUBLICATIONS

The International Search Report and the Written Opinion of the International Searching Authority, or HTE Declaration, corresponding patent application No. pct/us2024/021637, filed: Mar. 27, 2024, all pages.

* cited by examiner

_300_

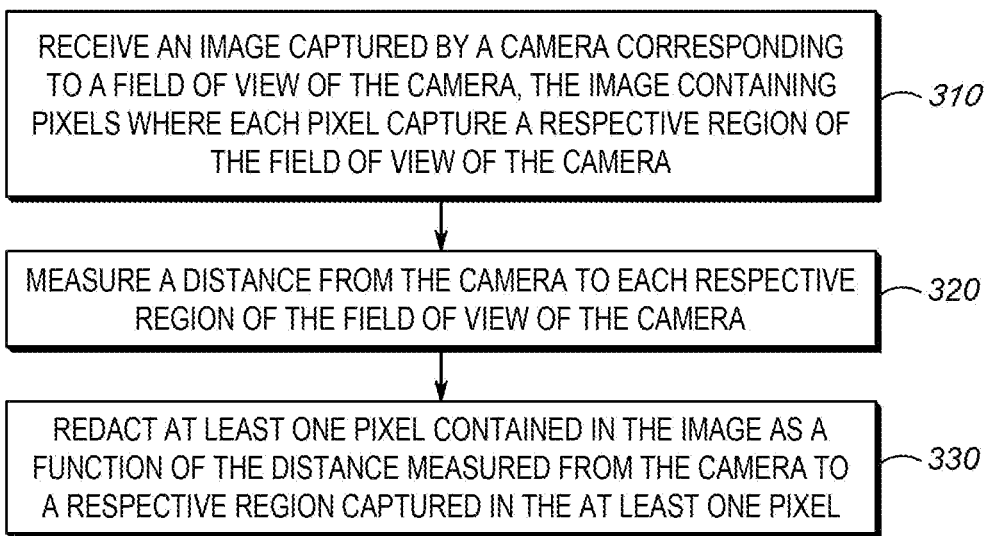

RECEIVE AN IMAGE CAPTURED BY A CAMERA CORRESPONDING TO A FIELD OF VIEW OF THE CAMERA, THE IMAGE CONTAINING PIXELS WHERE EACH PIXEL CAPTURE A RESPECTIVE REGION OF THE FIELD OF VIEW OF THE CAMERA — _310_

MEASURE A DISTANCE FROM THE CAMERA TO EACH RESPECTIVE REGION OF THE FIELD OF VIEW OF THE CAMERA — _320_

REDACT AT LEAST ONE PIXEL CONTAINED IN THE IMAGE AS A FUNCTION OF THE DISTANCE MEASURED FROM THE CAMERA TO A RESPECTIVE REGION CAPTURED IN THE AT LEAST ONE PIXEL — _330_

_FIG. 3_

DEVICE AND METHOD FOR REDACTING AN IMAGE

BACKGROUND

In order to protect privacy, most camera surveillance systems implement a privacy mask feature. This feature allows security operators to select a portion of a scene from the camera's field-of-view that should be redacted from an image captured by the camera prior to the image being stored or transmitted. Redaction may include obscuring, removing, or blocking out certain portions of the images captured by the camera. While a user can manually select portions of the scene that are to be redacted, such manual redaction may be time consuming and further prone to redactions errors.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

FIG. 3 illustrates a flowchart of a process for redacting an image in accordance with some embodiments.

Figure 1:
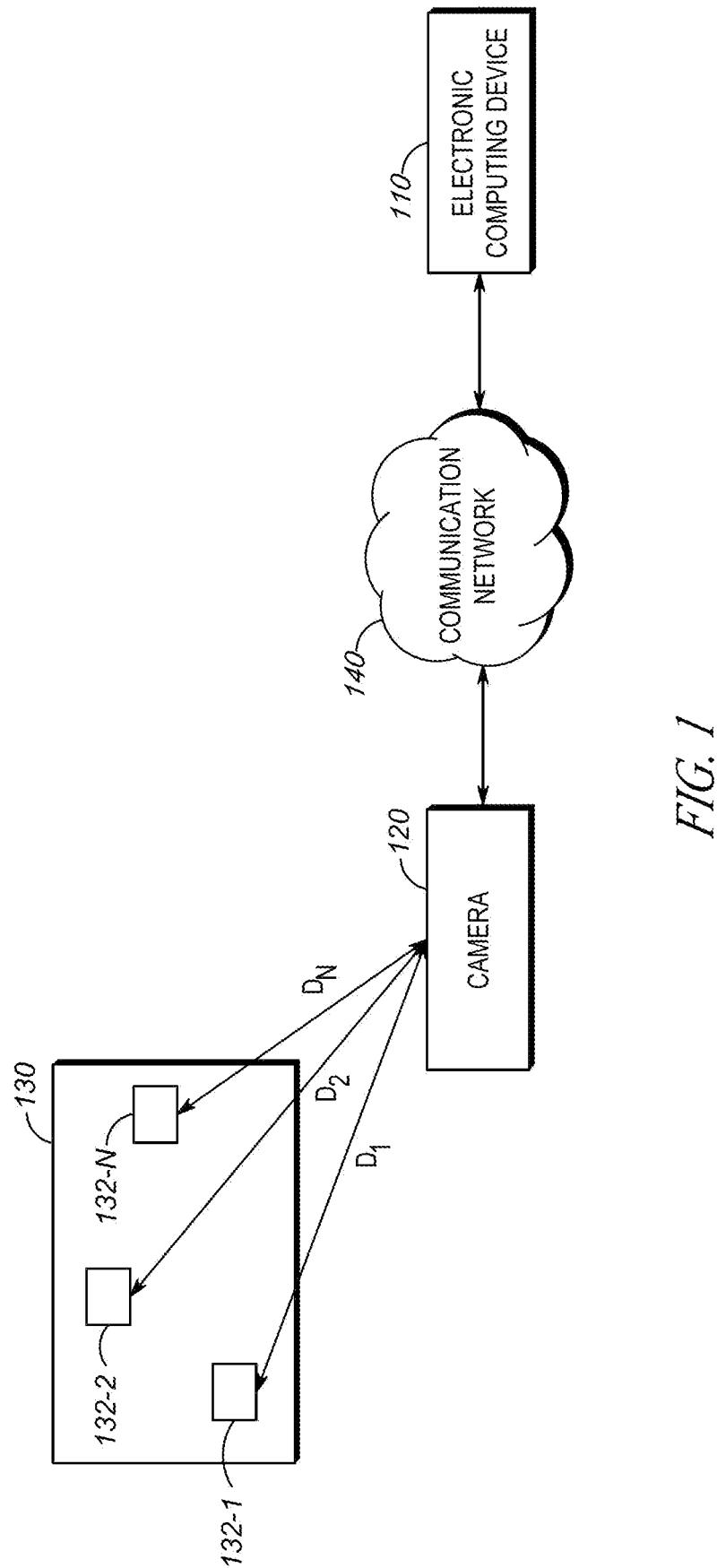
FIG. 1 is a block diagram of a system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

As described above, certain portions of the scene captured by a camera can be redacted for privacy reasons. However, selecting a redaction zone within a camera's field of view would also redact portions of the scene that may be of interest to the user. For example, assume a user has installed a camera in the front of her apartment to monitor the movement of persons or objects immediately outside the front of her apartment. In this case, the camera's field-of-view may extend to cover the front of the neighbor's premise even though the user may have no interest in monitoring the neighbor's premise. The neighbor may also have privacy concerns about the user's camera monitoring his premise. As another example, a manufacturer may use cameras to track the presence of employees working at a manufacturing plant but may not want the manufacturing equipment or processes to be recorded by the camera. As a further example, an hospital administration may use cameras to track people entering or exiting their facilities, but may not want to record in-patients who are being transported from one room to another room within the same facility. Accordingly, a technological solution is needed to automatically redact objects in certain areas within the field of view of the camera that the user may have no interest in monitoring.

One embodiment provides a method for redacting an image. The method comprises: receiving, at an electronic computing device, an image captured by a camera corresponding to a field of view of the camera, the image containing a plurality of pixels and each pixel in the plurality of pixels capturing a respective region in a plurality of regions of the field of view of the camera; measuring, at the electronic computing device, a distance from the camera to each respective region in the plurality of regions of the field of view of the camera; and redacting, at the electronic computing device, at least one pixel in the plurality of pixels contained in the image as a function of the distance measured from the camera to a respective region captured in the at least one pixel.

Another embodiment provides an electronic computing device, comprising: a communications unit; and an electronic processor communicatively coupled to the communications unit. The electronic processor is configured to: receive, via the communications. interface, an image captured by a camera corresponding to a field of view of the camera, the image containing a plurality of pixels and each pixel in the plurality of pixels capturing a respective region in a plurality of regions of the field of view of the camera; measure, at the electronic computing device, a distance from the camera to each respective region in the plurality of regions of the field of view of the camera; and redact, at the electronic computing device, at least one pixel in the plurality of pixels contained in the image as a function of the distance measured from the camera to a respective region captured in the at least one pixel.

Each of the above-mentioned embodiments will be discussed in more detail below, starting with example system and device architectures of the system in which the embodiments may be practiced, followed by an illustration of processing blocks for achieving an improved technical method of redacting an image. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1, a system 100 is shown including an electronic computing device 110 and one or more cameras 120. The electronic computing device 110 is any computing device configured to redact an image 130 captured by the camera 120 within a field of view of the camera 120 in accordance with the process described herein. The camera 120 includes, but is not limited to, surveillance cameras, vehicle cameras, body-worn cameras, mobile device cameras, and drone cameras that may be controlled and/or owned by a user. In some embodiments, the image 130 may include still and/or moving images. The image(s) 130 captured by the camera 120 may be stored by a user in one or more databases (not shown) that are accessible to the electronic computing device 110. The user may represent an individual or organizational entity who owns or operates a camera 120 deployed in their premises for surveillance purposes and has further subscribed to a redaction service implemented in accordance with the embodiments described herein. The user may subscribe to a redaction service that authorizes the electronic computing device 110 to access the image(s) captured by the camera 120 and further redact the captured image(s) in accordance with one or more redaction rules that each specify which regions captured in the images are to be redacted as a function of a distance measured from the camera 120 to the respective regions.

In accordance with embodiments, a pixel 132 contained in the image 130 captured by the camera 120 are redacted according to a distance measured from the camera 120 to a respective real-world space or region captured in the pixel 132. In the example shown in FIG. 1, the image 130 contains a plurality of pixels 132-1, 132-2 . . . 132-N. Each pixel 132 captures a respective region in a plurality of regions present within the field of view of the camera 120. For each pixel 132-1, 132-2, . . . 132-N, a respective distance $D_1, D_2 \ldots D_N$ from the camera 120 to a respective region captured in the pixel 132 is measured. In accordance with embodiments, the electronic computing device 110 may redact one or more pixels 132 contained in the image 130 as a function of the distance measured from the camera 120 to a respective region captured in the respective pixels 132. The user may define or select a redaction rule specifying a distance criteria to be used by the electronic computing device 110 in determining whether to redact a particular pixel 132 or to not redact a particular pixel 132. In one embodiment, an image 130 captured by the camera 120 is redacted by the electronic computing device 110 such that background objects (e.g., persons or objects appearing in pixels that are greater than a predefined distance from the camera 120) are redacted even while foreground objects (e.g., persons or objects appearing in pixels that are not greater than the predefined distance from the camera 120) can still be captured in the image 130 and monitored by the user. In another embodiment, an image 130 captured by the camera 120 is redacted by the electronic computing device 110 such that foreground objects (e.g., objects appearing in pixels that are not greater than a predefined distance from the camera 120) are redacted even while background objects (e.g., objects appearing in pixels that are not greater than the predefined distance from the camera 120) can still be captured in the image 130 and monitored by the user. For instance, a redaction rule may specify that any region greater than a predefined distance (e.g., 5 meters) from the camera 120 should be redacted. In this case, the electronic computing device 110 may redact only those pixels 132 where regions captured in the respective pixels 132 are greater than a predefined distance of 5 meters. As an example, in FIG. 1, the electronic computing device 110 may redact pixel 132-2 when a distance $D_2$ measured from the camera 120 to a region captured in the pixel 132-2 is greater than the predefined distance of 5 meters. On the other hand, in the example shown in FIG. 1, the electronic computing device 110 may not redact pixel 132-1 when a distance $D_1$ measured from the camera 120 to a region captured in the pixel 132-1 is not greater than the predefined distance of 5 meters.

The electronic computing device 110 communicates with the camera(s) 120 via one or more communication networks 140. For example, the electronic computing device 110 obtains image(s) captured by the camera(s) 120 via the communication network 140 for the purposes of redacting the image(s) in accordance with a redaction rule selected by the user. The communication network 140 includes wireless and wired connections. For example, the communication network 140 may be implemented using a wide area network, such as the Internet, a local area network, such as a Wi-Fi network, and personal area or near-field networks, for example a Bluetooth™ network. Portions of the communications network 140 may include a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, and combinations or derivatives thereof.

While only a single electronic computing device 110 is shown as being included in the system 100, the system 100 may include any number of electronic computing devices, where each electronic computing device may be controlled by different one or more service providers each providing a redaction service to a different group of users for redacting images captured by cameras 120 that are operated or deployed by the users in the respective groups.

Figure 2:
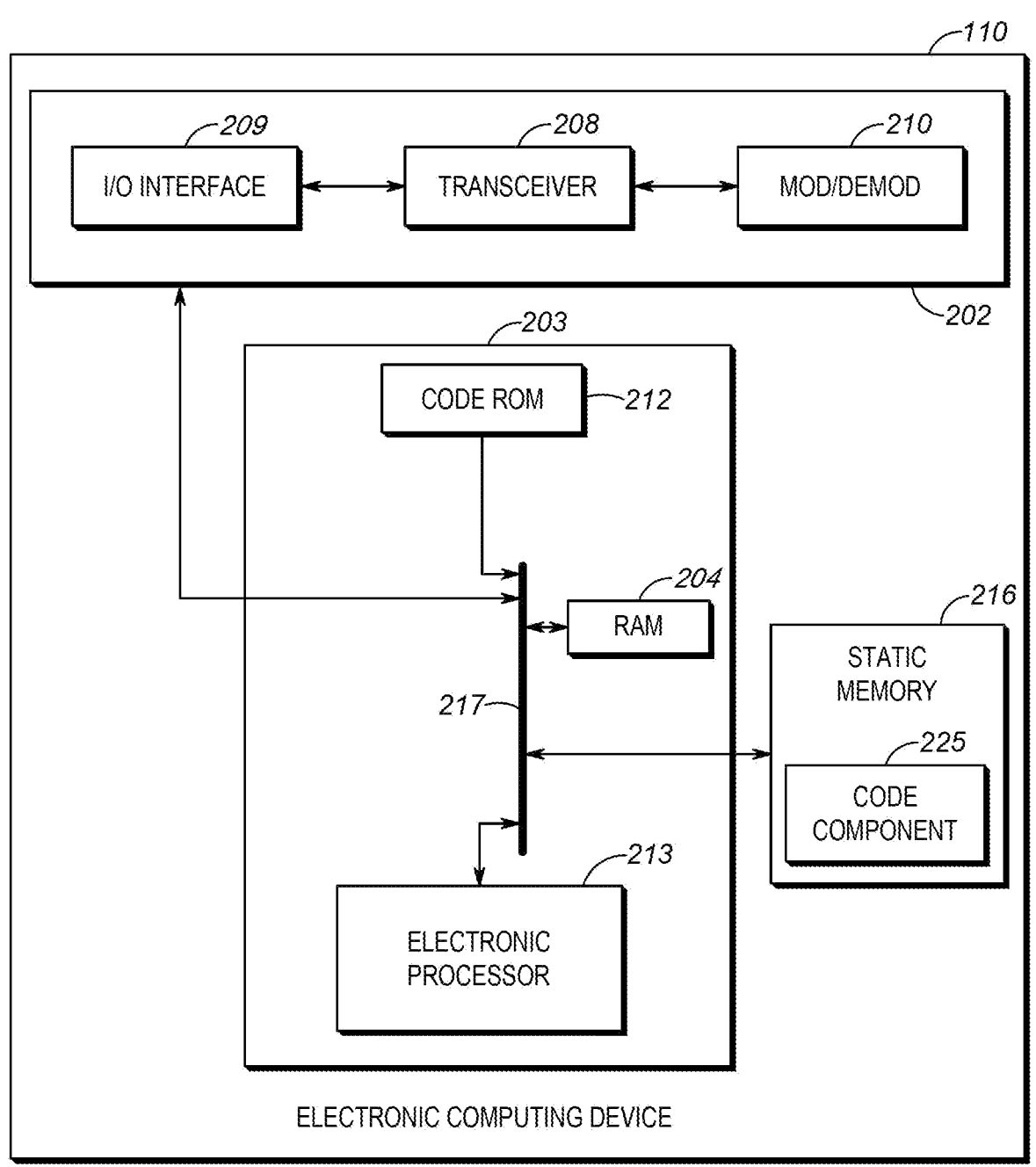
FIG. 2 is a block diagram of an electronic computing device shown in FIG. 1 in accordance with some embodiments.

FIG. 2 is an example functional block diagram of an electronic computing device 110 operating within the system 100 in accordance with some embodiments. The electronic computing device 110 may be embodied in computing devices not illustrated in FIG. 1, and/or may be a distributed computing device across two or more of the foregoing (or multiple of a same type of one of the foregoing) and linked via a wired and/or wireless communication link(s). In one embodiment, one or more functions of the electronic computing device 110 can be implemented within the camera 120. In these embodiments, the camera 120 may redact captured images in real-time in accordance with a redaction rule selected by the user. While FIG. 2 represents an electronic computing device 110 described above with respect to FIG. 1, depending on the type of redaction service, the electronic computing device 110 may include fewer or additional components in configurations different from that illustrated in FIG. 2.

As shown in FIG. 2, the electronic computing device 110 includes a communications unit 202 (also referred to as a "communications interface") coupled to a common data and address bus 217 of a processing unit 203. The communications unit 202 sends and receives data to and from other devices in the system 100. The communications unit 202 may include one or more wired and/or wireless input/output (I/O) interfaces 209 that are configurable to communicate with other devices in the system 100. For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (for example, 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network. The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The processing unit 203 may include an encoder/decoder with a code Read Only Memory (ROM) 212 coupled to the common data and address bus 217 for storing data for initializing system components. The processing unit 203 may further include an electronic processor 213 (for example, a microprocessor, a logic circuit, an application-specific integrated circuit, a field-programmable gate array, or another electronic device) coupled, by the common data and address bus 217, to a Random Access Memory (RAM) 204 and a static memory 216. The electronic processor 213 may generate electrical signals and may communicate signals through the communications unit 202.

Static memory 216 may store operating code 225 for the electronic processor 213 that, when executed, performs one or more of the blocks set forth in FIG. 3, and the accompanying text(s). The static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, and the like. The static memory 216 may temporarily or permanently store images received from the camera 120 for the purposes of redacting the images. The static memory 216 may also store distance measured from a camera 120 to each respective region in a plurality of regions of the field of view of the camera 120. The static memory 216 may further store one or more redaction rules (e.g., rules selected by the user) that specify a distance criteria that should be used to redact the images captured by the camera 120.

Turning now to FIG. 3, a flowchart diagram illustrates a process 300 for redacting an image captured by a camera 120. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. An electronic computing device 110 shown in FIG. 1 and/or FIG. 2, and embodied as a singular computing device or distributed computing device may execute process 300 via an electronic processor 213.

The electronic computing device 110 may execute the process 300 at power-on, at some predetermined periodic time period thereafter, in response to a trigger raised locally at the electronic computing device 110 via an internal process or via an input interface or in response to a trigger from an external device (e.g., a computing device associated with a user operating the camera 120) to which the electronic computing device 110 is communicably coupled, among other possibilities. As an example, the electronic computing device 110 is programmed to automatically trigger execution of the process 300 when a user subscribes to a redaction service for redacting images captured by a camera 120.

The process 300 of FIG. 3 need not be performed in the exact sequence as shown and likewise various blocks may be performed in different order or alternatively in parallel rather than in sequence. The process 300 may be implemented on variations of the system 100 of FIG. 1 as well. The process 300 will be described below with reference to FIGS. 4-7 that show how different redaction rules with different distance criteria may be applied for redacting images captured by the camera 120.

At block 310, the electronic computing device 110 receives an image captured by the camera 120 corresponding to a field of view of the camera 120. The image captured by the camera contains a plurality of pixels 132 and each pixel 132 in the plurality of pixels capture a respective region in a plurality of regions of the field of view of the camera 120. In accordance with some embodiments, the electronic computing device 110 automatically has access (e.g., in response to a user subscribing the user's camera 120 to a redaction service) to each image captured by the camera 120. In these embodiments, the electronic computing device 110 automatically receives each image (either in real-time or after the image has been stored at the camera or in a remote storage device) captured by the camera 120 for the purpose of redacting the images. In another embodiment, the user may select and specify particular images captured by the camera 120 that should be subject to the redaction process. In this embodiment, the electronic computing device 110 receives access to only those images that are selected by the user for redaction.

At block 320, the electronic computing device 110 measures a distance from the camera 120 to each respective region in the plurality of regions in the field of view of the camera 120. The electronic computing device 110 may use any distance measurement technique to measure the distance from the camera 120 to a respective region within the field of view of the camera 120. In one embodiment, the electronic computing device 110 measures a distance from the camera 120 to a particular region in the field of view of the camera 120 by controlling the camera 120 to change the focus as long as the pixels capturing the particular region in the camera's field of view create a picture at a predefined quality level. The distance from the camera 120 to the region represented in one or more pixels is then calculated as a function of the change in the focus that is used to achieve the picture of the predefined quality level.

In another embodiment, the electronic computing device 110 measures a distance from the camera 120 to a particular region in the field of view of the camera 120 as a function of an elevated distance from the ground to a deployed position of the camera 120 and an angle at which the camera 120 is focused onto a particular region in the field of view of the camera 120. As an example, the electronic computing device 110 may use a mathematical function $D_I = E_I \ast \tan(A_I)$ to measure a distance $(D_I)$ measured from the camera 120 to a particular region (captured in a particular pixel of an image) in the field of view of the camera 120, I is the particular real-world region or space (where I=1, 2 . . . . N) (in the field of view of the camera 120) to which distance is measured from the camera 120, E is the elevated distance from the ground to a deployed position of the camera 120, and A is the angle at which the camera 120 is focused onto the particular region in the field of the camera 120. The electronic computing device 110 may repeat the distance measurement process for each region 'I' in the field of view of the camera 120 to measure a respective distance from the camera 120 to each respective region 'I' in the field of view of the camera 120. As an example, if the camera's field of view is divided into 4 gigapixels, the electronic computing device 110 may calculate and store a distance measured from the camera 120 to each of those 4 gigapixels contained within an image captured by the camera 120. Other techniques for measuring a distance from the camera to a respective region in the field of view of the camera 120 are also within the scope of the embodiments described herein.

At block 330, the electronic computing device 110 redacts at least one pixel (e.g., pixel 132-2 captured in an image 130 shown in FIG. 1) in the plurality of pixels 132 contained in the image as a function of the distance measured from the camera 120 to a respective region captured in the at least one pixel. In accordance with embodiments, the electronic computing device 110 retrieves a redaction rule selected by the user to identify which pixel or pixels contained in the image 130 should be redacted. After identifying the pixels in the image, the electronic computing device 110 uses one or more types of redaction techniques (e.g., blurring, masking, removing, or resizing the identified pixels) to redact the pixels that are identified based on a distance criteria specified in the redaction rule selected by the user.

In one embodiment, the redaction technique may involve application of a redaction filter (e.g., blur filter) to pixel values of an identified pixel contained in the image. The application of a redaction filter may modify optical characteristics (e.g., reduction of optical intensity) of one or more pixel values to which the filter is applied. The modification of the optical characteristics of the pixel values may make the pixel (e.g., a pixel showing a person's facial feature) within a particular image more coherent and less distinct, resulting in a redacted image. Alternatively, the redaction technique may also involve removing certain pixel values within an image captured by the camera 120. In accordance with embodiments, the electronic computing device 110 generates a redacted version of the image captured by the camera 120 after redacting all pixels that are identified to have met the distance criteria specified in the redaction rule selected by the user. The electronic computing device 110 then stores the redacted version of the image at a local memory of the electronic computing device 110 and/or the camera 120. Optionally, the electronic computing device 110 may also transmit the redacted version of the image to a remote storage device. In some embodiments, the electronic computing device 110 may further delete the original unredacted version of the image captured by the camera 120 immediately after redaction or after a predefined time period.

In accordance with embodiments, a user requesting a redaction service for images captured by a particular camera may select a particular redaction rule from a plurality of different redaction rules (e.g., a first redaction rule, a second redaction rule, a third redaction rule, and a fourth redaction rule) provisioned at the electronic computing device 110 to determine which pixels contained in the images captured by the camera 120 should be redacted. FIGS. 4-7 illustrate applications of different redaction rules for redacting images captured by a camera 120, where each different redaction rule specifies a different distance criteria to be used in determining which pixels contained in an image should be redacted. Although only four redaction rules have been described herein as examples, embodiments described herein are not limited to such examples. The embodiments described herein can be similarly implemented to redact images for any new redaction rule that may be defined by the user with a new distance criteria for identifying pixels contained in an image for redaction.

Figure 4:
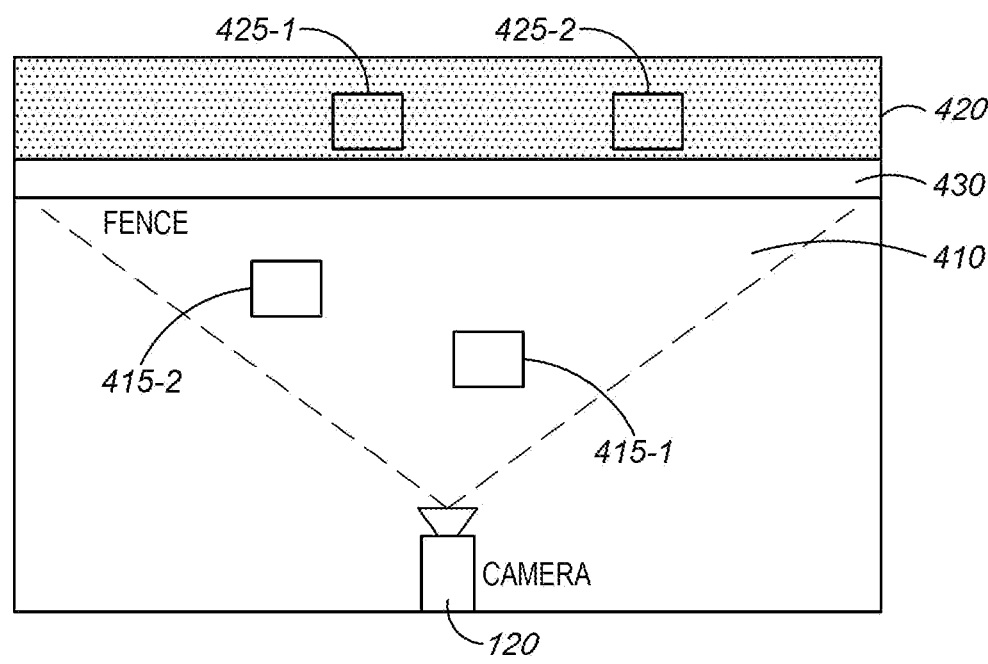
FIG. 4 illustrates an application of a first redaction rule for redacting an image in accordance with some embodiments.

Now referring to FIG. 4, an application of a first redaction rule for redacting an image captured by a camera 120 is shown. In the example shown in FIG. 4, the electronic computing device 110 determines that a user operating the camera 120 has requested a redaction service in accordance with a first redaction rule which requires redaction of all pixels captured in regions within the field of view of the camera 120 that are greater than a predefined distance (e.g., 20 meters) from the camera 120. Accordingly, in this example, the electronic computing device 110 initiates the redaction process 300 by retrieving a first redaction rule (e.g., provisioned at the static memory 216) corresponding to the redaction service requested by the user. The electronic computing device 110 determines that the first redaction rule requires redaction of pixels captured in regions that are greater than a predefined distance (e.g., 20 meters) from the camera 120. The electronic computing device 110 then redacts at least one pixel (e.g., pixels 425-1, 425-2 shown in FIG.) contained in the image captured by the camera 120 in response to determining that a distance measured from the camera 120 to a respective region captured in the at least one pixel is greater than the predefined distance.

As shown in FIG. 4, the camera's field of view includes a fence 430 that divides the field of view into a first area 410 and a second area 420. Assume the user operating the camera 120 wants to redact the regions in the second area 420 outside of the fence 430, but not the regions in the first area 410 inside of the fence 430 and further the user has determined that the fence is 20 meters away from the camera 120. Assume the user further defines a first redaction rule specifying a distance criteria indicating that all regions (i.e., regions within the second area 420) in the camera's field of view with distances greater than 20 meters from the camera should be redacted. In this example, the first area 410 represents all regions within the field of view of the camera 120 with distances measured from the camera 120 that are not greater than the predefined distance of 20 meters from the camera. The second area 420 represents all regions within the field of view of the camera 120 with distances measured from the camera 120 that are greater than the predefined distance of 5 meters from the camera 120. Accordingly, the electronic computing device 110 applies the first redaction rule to identify those pixels that capture the regions represented by the second area 420 within the field of view of the camera 120 that are greater than the predefined distance of 20 meters from the camera 120. The electronic computing device 110 then redacts (e.g., blurs) all pixels within the regions of the second area 420. On the other hand, the electronic computing device 110 does not redact any of the pixels capturing the regions represented by the first area 410 within the field of view of the camera 120 that are not greater than the predefined distance of 20 meters from the camera 120. For example, as further shown in FIG. 4, the electronic computing device 110 has not redacted pixels 415-1, 415-2 capturing regions within the first area 410 because a respective distance measured from the camera 120 to the regions captured in the respective pixels 415-1, 415-2 is not greater than the predefined distance of 20 meters.

Figure 5:
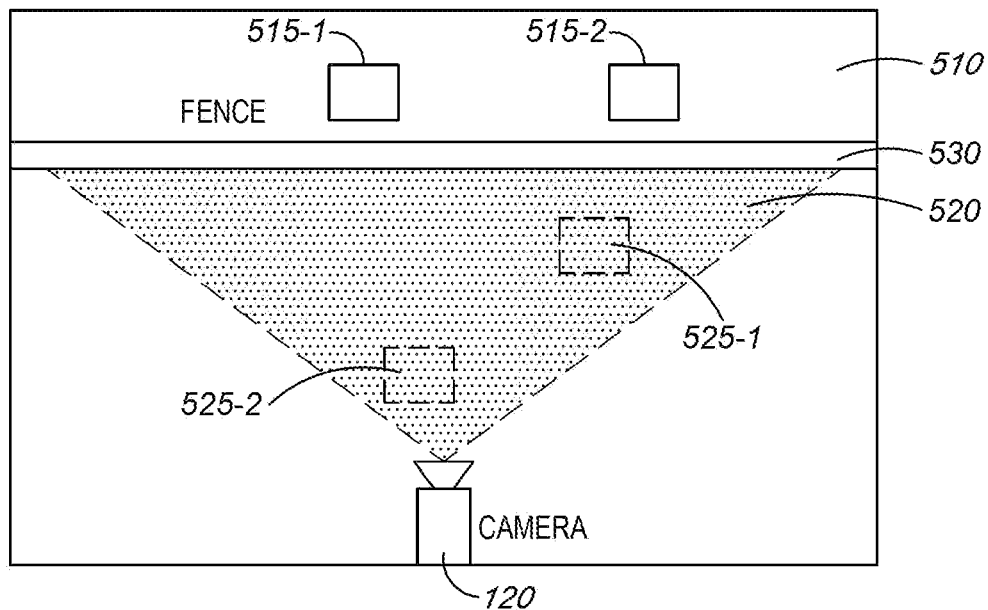
FIG. 5 illustrates an application of a second redaction rule for redacting an image in accordance with some embodiments.

Now referring to FIG. 5, an application of a second redaction rule for redacting an image captured by a camera 120 is shown. In the example shown in FIG. 4, the electronic computing device 110 determines that a user operating the camera 120 has requested a redaction service in accordance with a second redaction rule which requires redaction of all pixels captured in regions within the field of view of the camera 120 that are not greater than a predefined distance (e.g., 20 meters) from the camera 120. Accordingly, in this example, the electronic computing device 110 initiates the redaction process 300 by retrieving a second redaction rule corresponding to the redaction service requested by the user. The electronic computing device 110 determines that the second redaction rule requires redaction of pixels captured in regions that are not greater than a predefined distance from the camera 120. The electronic computing device 110 then redacts at least one pixel (e.g., pixels 525-1, 525-2) contained in the image captured by the camera 120 in response to determining that a distance measured from the camera 120 to a respective region captured in the at least one pixel is not greater than the predefined distance.

As shown in FIG. 5, the camera's field of view includes a fence 530 that divides the field of view into a first area 510 and a second area 520. Assume the user wants to redact the regions in the second area 520 inside of the fence, but not the regions in the first area 510 outside of the fence and further the user has determined that the fence is 20 meters away from the camera 120. Assume the user further defines a second redaction rule specifying a distance criteria indicating that all regions (i.e., regions within the second area 520) in the camera's field of view with distances not greater than 20 meters from the camera 120 should be redacted. In this example, the first area 510 represents all regions within the field of view of the camera 120 with distances measured from the camera 120 that are greater than the predefined distance of 20 meters from the camera 120. The second area 520 represents all regions within the field of view of the camera 120 with distances measured from the camera 120 that are not greater than the predefined distance of 20 meters from the camera 120. Accordingly, the electronic computing device 110 applies the second redaction rule to identify those pixels that capture the regions represented by the second area 520 within the field of view of the camera 120 that are not greater than the predefined distance from the camera 120. The electronic computing device 110 then redacts (e.g., blurs) all pixels within the regions of the second area 520. For example, as shown in FIG. 5, the electronic computing device 110 has redacted pixels 525-1, 525-2 present within the second area 520 because a respective distance measured from the camera 120 to the respective regions captured in the respective pixels 525-1, 525-2 is not greater than the predefined distance of 20 meters. On the other hand, the electronic computing device 110 does not redact any of the pixels capturing the regions represented by the first area 510 within the field of view of the camera 120 that are greater than the predefined distance from the camera 120. For example, as further shown in FIG. 5, the electronic computing device 110 has not redacted pixels 515-1, 515-2 present within the first area 510 because a respective distance measured from the camera 120 to the respective regions captured in the respective pixels 515-1, 515-2 is greater than the predefined distance of 20 meters.

Figure 6:
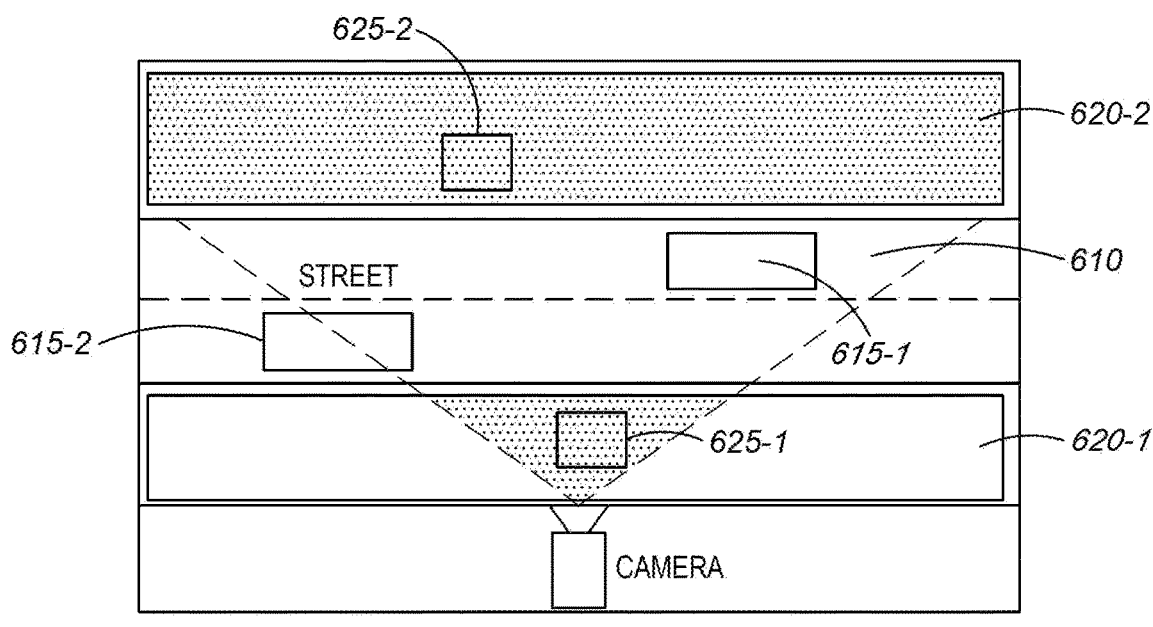
FIG. 6 illustrates an application of a third redaction rule for redacting an image in accordance with some embodiments.

Now referring to FIG. 6, an application of a third redaction rule for redacting an image captured by a camera 120 is shown. In the example shown in FIG. 6, the electronic computing device 110 determines that a user operating the camera 120 has requested a redaction service in accordance with a third redaction rule which requires redaction of all pixels captured in regions within the field of view of the camera 120 that are greater than a first predefined distance (e.g., 25 meters) from the camera 120 or are not greater than a second predefined distance (e.g., 10 meters). Accordingly, in this example, the electronic computing device 110 initiates the redaction process 300 by retrieving a third redaction rule corresponding to the redaction service requested by the user. The electronic computing device 110 determines that the third redaction rule requires redaction of pixels captured in regions that are greater than a first predefined distance (e.g., 25 meters) from the camera 120 or are not greater than a second predefined distance (e.g., 10 meters). The electronic computing device 110 then redacts at least one pixel contained in the image captured by the camera 120 in response to determining that a distance measured from the camera 120 to a respective region captured in the at least one pixel is greater than the first predefined distance from the camera 120 or is not greater than the second predefined distance from the camera 120.

As shown in FIG. 6, the camera's field of view is divided into a first area 610, a second area 620-1, and third area 620-2. Assume the first area 610 represents a public street and the second and third areas represent private facilities. Further assume the user operating the camera 120 wants to monitor the activities in the public street, but not the activities in the private facilities. In this case, the user can define a third redaction rule specifying a distance criteria indicating that all regions in the field of view of the camera that are greater than a first predefined distance (e.g., 25 meters) should be redacted or all regions in the field of view of the camera that are not greater than the second predefined distance (e.g., 10 meters) should be redacted. In this example, the second area 620-1 represents all regions within the field of view of the camera 120 with distances measured from the camera 120 that are not greater than the second predefined distance of 10 meters from the camera. The third area 620-2 represents all regions within the field of view of the camera 120 with distances measured from the camera 120 that are greater than the first predefined distance of 25 meters from the camera 120. Accordingly, the electronic computing device 110 applies the third redaction rule to identify those pixels that capture the regions represented by the second and third areas 620-1, 620-2 within the field of view of the camera 120 that are either greater than the first predefined distance of 25 meters from the camera 120 or not greater than the second predefined distance of 10 meters from the camera 120. The electronic computing device 110 then redacts (e.g., blurs) all pixels within the regions of the second and third areas 620-1, 620-2. For example, as shown in FIG. 6, the electronic computing device 110 has redacted pixel 625-1 capturing a region present within the second area 620-1 because a distance measured from the camera 120 to the region captured in the pixel 625-1 is not greater than the second predefined distance of 10 meters. Further, the electronic computing device 110 has redacted pixel 625-2 capturing a region present within the third area 620-2 because a distance measured from the camera 120 to the region captured in the pixel 625-2 is greater than the first predefined distance of 25 meters. On the other hand, the electronic computing device 110 does not redact any of the pixels capturing the regions represented by the first area 610 within the field of view of the camera 120 that are neither greater than the first predefined distance of 25 meters nor lower than the second predefined distance of 10 meters. For example, as further shown in FIG. 6, the electronic computing device 110 has refrained from redacting pixels 615-1, 615-2 present within the first area 610 because a respective distance measured from the camera 120 to the respective regions captured in the respective pixels 415-1, 415-2 is neither greater than the first predefined distance of 25 meters nor lower than the second predefined distance of 10 meters.

Figure 7:
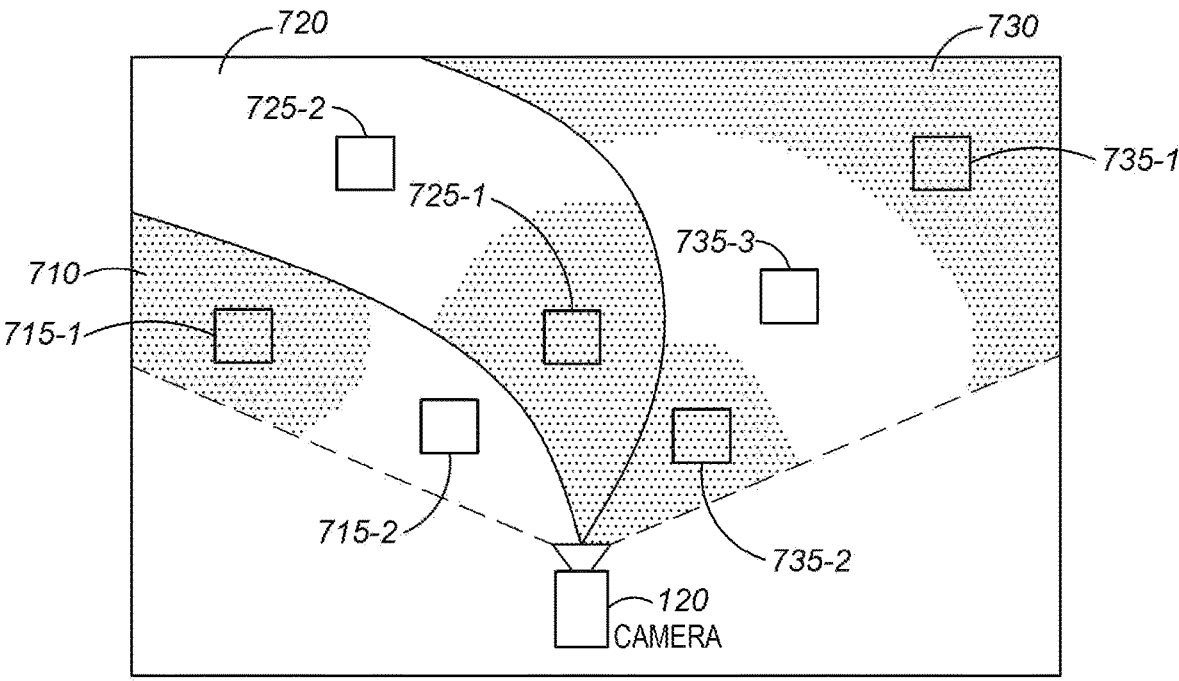
FIG. 7 illustrates an application of a fourth redaction rule for redacting an image in accordance with some embodiments.

Now referring to FIG. 7, an application of a fourth redaction rule to redacting an image captured by a camera 120 is shown. In the example shown in FIG. 7, the electronic computing device 110 determines that a user operating the camera 120 has requested a redaction service in accordance with a fourth redaction rule which requires defining a plurality of sectors within the field of view of the camera 120 and further applying different redaction rules to different one of the sectors. In accordance with some embodiments, the user operating the camera 120 may be provided with a computing device to display the field of view of the camera 120. The user can use a suitable input interface to define a plurality of sectors within the displayed field of view and further the user can select different redaction rules to be applied to different sectors. The sectors within the field of view may be of any size or shape as generated based on the user's input. Moreover, the user may define any number of sectors within the field of view of the camera 120. In the example shown in FIG. 7, assume the user has divided the camera's field of view into a first sector 710, a second sector 720, and a third sector 730. Further assume that the user has selected a first redaction rule to be applied to the first sector 710, a second redaction rule to be applied to the second sector 720, and a third redaction rule to be applied to the third sector 730. In this case, for each pixel contained within the image captured by the camera 120, the electronic computing device 110 first identifies a sector in which the pixel is located and further retrieves a corresponding redaction rule to be applied to the identified sector in accordance with the user's input. The electronic computing device 110 then determines whether the pixel should be redacted or not by applying a distance criteria specified in the corresponding redaction rule.

With respect to the first sector 710 shown in FIG. 7, the electronic computing device 110 determines that the fourth redaction rule requires a further application of a first redaction rule to pixels captured in regions bounded within the first sector. The electronic computing device 110 retrieves the first redaction rule which requires redaction of pixels captured in regions that are greater than a predefined distance (e.g., 20 meters) from the camera 120. Accordingly, the electronic computing device 110 applies the first redaction rule to identify those pixels that capture the regions bounded within the first sector 710 of the field of view of the camera 120 that are greater than the predefined distance from the camera 120. In the example shown in FIG. 7, the electronic computing device 110 determines that a distance measured from a region captured in a pixel 715-1 is greater than the predefined distance of 20 meters from the camera 120. The electronic computing device 110 then redacts (e.g., blurs) pixel 715-1 as well as other pixels capturing the regions of the first sector 710 that are greater than the predefined distance from the camera 120. On the other hand, the electronic computing device 110 does not redact any of the pixels capturing the regions bounded within the first sector 710 that are not greater than the predefined distance from the camera 120. For example, as further shown in FIG. 7, the electronic computing device 110 determines that a distance measured from the camera 120 to a region captured in the pixel 715-2 is not greater than the predefined distance of 20 meters. In this case, the electronic computing device refrains from redacting the pixel 715-2 captured in a region bounded within the first sector 710.

With respect to the second sector 720 shown in FIG. 7, the electronic computing device 110 determines that the fourth redaction rule requires a further application of a second redaction rule to pixels captured in regions bounded within the second sector 720. The electronic computing device 110 retrieves the second redaction rule which requires redaction of pixels captured in regions that are not greater than a predefined distance (e.g., 15 meters) from the camera 120. Accordingly, the electronic computing device 110 applies the second redaction rule to identify those pixels that capture the regions bounded within the second sector 720 of the field of view of the camera 120 that are not greater than the predefined distance from the camera 120. In the example shown in FIG. 7, the electronic computing device 110 determines that a distance measured from a region captured in a pixel 725-1 is not greater than the predefined distance of 15 meters from the camera 120. The electronic computing device 110 then redacts (e.g., blurs) pixel 725-1 as well as other pixels capturing the regions of the second sector 720 that are not greater than the predefined distance from the camera 120. On the other hand, the electronic computing device 110 does not redact any of the pixels capturing the regions bounded within the first sector 710 that are greater than the predefined distance from the camera 120. For example, as further shown in FIG. 7, the electronic computing device 110 determines that a distance measured from the camera 120 to a region captured in the pixel 725-2 is greater than the predefined distance of 15 meters. In this case, the electronic computing device refrains from redacting the pixel 725-2 captured in a region bounded within the second sector 720.

With respect to the third sector 730 shown in FIG. 7, the electronic computing device 110 determines that the fourth redaction rule requires a further application of a third redaction rule to pixels captured in regions bounded within the third sector 730. The electronic computing device 110 retrieves the third redaction rule which requires redaction of pixels captured in regions that are greater than a first predefined distance (e.g., 25 meters) from the camera 120 or are not greater than a second predefined distance (e.g., 10 meters) from the camera 120. Accordingly, the electronic computing device 110 applies the third redaction rule to identify those pixels that capture the regions bounded within the third sector 730 of the field of view of the camera 120 that are either greater than the predefined distance from the camera 120 or are not greater than the second predefined distance from the camera 120. In the example shown in FIG. 7, the electronic computing device 110 determines that a distance measured from a region captured in a pixel 735-1 is greater than the first predefined distance of 25 meters from the camera 120. The electronic computing device 110 then redacts (e.g., blurs) pixel 735-1 as well as other pixels capturing the regions of the third sector 730 that are greater than the first predefined distance from the camera 120. The electronic computing device 110 also determines that a distance measured from a region captured in a pixel 735-2 is not greater than the second predefined distance of 10 meters from the camera 120. The electronic computing device 110 accordingly also redacts pixel 735-2 as well as other pixels capturing the regions of the third sector 730 that are not greater than the second predefined distance of 10 meters from the camera 120. On the other hand, the electronic computing device 110 does not redact any of the pixels capturing the regions bounded with the third sector 730 within the field of view of the camera 120 that are neither greater than the first predefined distance from the camera 120 nor not greater than the second predefined distance from the camera 120. For example, as further shown in FIG. 7, the electronic computing device 110 determines that a distance measured from the camera 120 to a respective region captured in the pixel 735-3 is neither greater than the first predefined distance of 25 meters nor not greater than the second predefined distance of 10 meters from the camera 120. In this case, the electronic computing device refrains from redacting the pixel 732-3 captured in a region bounded within the third sector 730.

As should be apparent from this detailed description, the operations and functions of the computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of redacting an image, the method comprising:

receiving, at an electronic computing device, an image captured by a camera corresponding to a field of view of the camera, the image containing a plurality of pixels and each pixel in the plurality of pixels capturing a respective region in a plurality of regions of the field of view of the camera;

measuring, at the electronic computing device, multiple distances from the camera to the plurality of regions of the field of view of the camera, wherein measuring the multiple distances comprises measuring a respective distance from the camera to each respective region captured by each and every pixel in the plurality of pixels;

retrieving a predefined redaction rule provisioned into a memory of the electronic computing device, the predefined redaction rule specifying a distance criterion for redaction;

in response to determining that a first distance of the multiple distances measured from the camera to a first respective region captured in a first pixel of the plurality of pixels satisfies the distance criterion, redacting the first pixel contained in the image; and in response to determining that a second distance of the multiple distances measured from the camera to a second respective region captured in a second pixel of the plurality of pixels does not satisfy the distance criterion, refraining from redacting the second pixel contained in the image.

2. The method of claim 1, wherein redacting comprises:

determining that the distance criterion requires redaction of pixels captured in regions that are greater than a predefined distance from the camera; and redacting the first pixel in response to determining that the distance measured from the camera to the first respective region captured in the first pixel is greater than the predefined distance.

3. The method of claim 1, wherein redacting comprises:

determining that the distance criterion requires redaction of pixels captured in regions that are not greater than a predefined distance from the camera; and redacting the first pixel in response to determining that the distance measured from the camera to the first respective region captured in the first pixel is not greater than the predefined distance.

4. The method of claim 1, wherein redacting comprises:

determining that the distance criterion requires redaction of pixels captured in regions that are greater than a first predefined distance from the camera or are not greater than a second predefined distance from the camera; and redacting the first pixel in response to determining that the distance measured from the camera to the first respective region captured in the first pixel is greater than the first predefined distance from the camera or is not greater than the second predefined distance from the camera.

5. The method of claim 1, wherein redacting comprises:

retrieving a second redaction rule provisioned into the memory of the electronic computing device, wherein the second redaction rule requires defining a plurality of sectors in the field of view of the camera and further applying different distance criterion to different one of the sectors.

6. The method of claim 5, further comprising:

determining that the first pixel is captured in a region bounded within a first sector of the plurality of sectors;

determining that a first distance criterion specified in the second redaction rule is required to be applied to pixels captured in regions bounded within the first sector;

determining that the first distance criterion requires redaction of pixels captured in regions that are greater than a predefined distance from the camera; and redacting the first pixel in response to determining that the distance measured from the camera to the first respective region captured in the first pixel is greater than the predefined distance.

7. The method of claim 5, further comprising:

determining that the first pixel is captured in a region bounded within a second sector of the plurality of sectors;

determining that a second distance criterion specified in the second redaction rule is required to be applied to pixels captured in regions bounded within the second sector;

determining that the second distance criterion requires redaction of pixels captured in regions that are not greater than a predefined distance; and redacting the first pixel in response to determining that the distance measured from the camera to the first respective region captured in the first pixel is not greater than the predefined distance.

8. The method of claim 5, further comprising:

determining that the first pixel is captured in a region bounded within a third sector of the plurality of sectors;

determining that a third distance criterion specified in the second redaction rule is required to be applied to pixels captured in regions bounded within the third sector;

determining that the third distance criterion requires redaction of pixels captured in regions that are greater than a first predefined distance from the camera or are not greater than a second predefined distance from the camera; and redacting the first pixel in response to determining that the distance measured from the camera to the first respective region captured in the first pixel is greater than the first predefined distance but not greater than the second predefined distance.

9. The method of claim 1, wherein refraining from redacting comprises:

determining that the distance criterion requires redaction of pixels captured in regions that are greater than a predefined distance from the camera; and refraining from redacting the second pixel in response to determining that the distance measured from the camera to the second respective region captured in the second pixel is not greater than the predefined distance.

10. The method of claim 1, wherein refraining from redacting comprises:

determining that the distance criterion requires redaction of pixels captured in regions that are not greater than a predefined distance from the camera; and refraining from redacting the at second pixel in response to determining that the distance measured from the camera to the second respective region captured in the second pixel is greater than the predefined distance.

11. The method of claim 1, wherein refraining from redacting comprises:

determining that the distance criterion requires redaction of pixels captured in regions that are greater than a first predefined distance from the camera but not greater than a second predefined distance from the camera; and refraining from redacting the second pixel in response to determining that the distance measured from the camera to the second respective region captured in the at second pixel is either not greater than the first predefined distance or greater than the second predefined distance.

12. The method of claim 1, wherein refraining from redacting comprises:

retrieving a second redaction rule provisioned into the memory of the electronic computing device, wherein the second redaction rule requires defining a plurality of sectors within the field of view of the camera and applying different distance criterion for different one of the sectors.

13. The method of claim 12, further comprising:

determining that the second pixel is captured in a region bounded within a first sector of the plurality of sectors;

determining that a first distance criterion specified in the second redaction rule is required to be applied to pixels captured in regions bounded within the first sector;

determining that the first distance criterion requires redaction of pixels captured in regions that are greater than a predefined distance; and refraining from redacting the second pixel in response to determining that the distance measured from the camera to the second respective region captured in the at second pixel is not greater than the predefined distance.

14. The method of claim 12, further comprising:

determining that the second pixel is captured in a region bounded within a second sector of the plurality of sectors;

determining that a second distance criterion specified in the second redaction rule is required to be applied to pixels captured in regions bounded within the second sector;

determining that the second distance criterion requires redaction of pixels captured in regions that are not greater than a predefined distance; and refraining from redacting the second pixel in response to determining that the distance measured from the camera to the second respective region captured in the second pixel is greater than the predefined distance.

15. The method of claim 12, further comprising:

determining that the second pixel is captured in a region bounded within a third sector of the plurality of sectors;

determining that a third distance criterion specified in the second redaction rule is required to be applied to pixels captured in regions bounded within the third sector;

determining that the third distance criterion requires redaction of pixels captured in regions that are greater than a first predefined distance from the camera but not greater than a second predefined distance from the camera; and refraining from redacting the second pixel in response to determining that the distance measured from the camera to the second respective region captured in the second pixel is either not greater than the first predefined distance or greater than the second predefined distance.

16. The method of claim 1, wherein measuring comprises:

measuring the distance from the camera to each respective region as a function of an elevated distance from the ground to a deployed position of the camera and an angle at which the camera is focused onto the respective region in the field of view of the camera.

17. The method of claim 1, further comprising:

generating a redacted version of the image based on redacting the first pixel in the plurality of pixels contained in the image; and storing and/or transmitting the redacted version of the image.

18. An electronic computing device, comprising:

a communications interface;

a memory configured to store a predefined redaction rule specifying a distance criterion for redaction; and an electronic processor communicatively coupled to the communications interface and the memory, the electronic processor configured to:

receive, via the communications interface, an image captured by a camera corresponding to a field of view of the camera, the image containing a plurality of pixels and each pixel in the plurality of pixels capturing a respective region in a plurality of regions of the field of view of the camera;

measure, at the electronic computing device, multiple distances from the camera to the plurality of regions of the field of view of the camera, wherein measuring the multiple distance comprises measuring a respective distance from the camera to each respective region captured by each and every pixel in the plurality of pixels;

in response to determining that a first distance of the multiple distances measured from the camera to a first respective region captured in a first pixel of the plurality of pixels satisfies the distance criterion, redact the first pixel contained in the image; and in response to determining that a second distance of the multiple distances measured from the camera to a second respective region captured in a second pixel of the plurality of pixels does not satisfy the distance criterion, refrain from redacting the second pixel contained in the image.

\* \* \* \* \*